(12) United States Patent
Yaeger

(10) Patent No.: US 6,519,115 B1
(45) Date of Patent: Feb. 11, 2003

(54) LOW WEAR, LOW FRICTION RAMP METHOD AND APPARATUS FOR A DISC DRIVE SYSTEM

(75) Inventor: John Richard Yaeger, Sunnyvale, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 08/327,389

(22) Filed: Oct. 21, 1994

(51) Int. Cl.[7] ............................................... G11B 21/22
(52) U.S. Cl. .................................................... 360/255.7
(58) Field of Search .............................. 360/105, 255.7

(56) References Cited

U.S. PATENT DOCUMENTS

| | | | |
|---|---|---|---|
| 3,376,082 A | | 4/1968 | Soder ............................ 308/3 |
| 4,040,106 A | * | 8/1977 | Medley ....................... 360/106 |
| 4,582,368 A | | 4/1986 | Fujita et al. ................ 308/5 R |
| 4,666,787 A | | 5/1987 | Bicle et al. ................... 428/550 |
| 4,944,606 A | | 7/1990 | Lindsey et al. ................ 384/42 |
| 5,034,837 A | | 7/1991 | Schmitz ....................... 360/105 |
| 5,148,339 A | | 9/1992 | Yoshida ....................... 360/105 |
| 5,156,919 A | * | 10/1992 | Brar et al. ................... 360/106 |
| 5,166,847 A | * | 11/1992 | Zak ............................. 360/104 |
| 5,189,575 A | | 2/1993 | Onooka et al. .............. 360/105 |
| 5,189,576 A | | 2/1993 | Morehouse et al. ........ 360/105 |
| 5,236,784 A | | 8/1993 | Kobayashi et al. ......... 428/408 |
| 5,237,472 A | * | 8/1993 | MoreHouse et al. ........ 360/105 |

* cited by examiner

*Primary Examiner*—David Davis
(74) *Attorney, Agent, or Firm*—Derek Berger

(57) ABSTRACT

A novel ramp loading scheme minimizes wear and friction between the rubbing surfaces (typically the flexure and the ramp surface) where both the ramp assembly and the actuator arm are coated with a hard, low-friction fluoropolymer compound. Tests conducted with this coating-on-coating scheme demonstrated that, after multiple load/unload cycles, the coefficient of friction along the rubbing surfaces was low and did not change appreciably. To minimize flying debris, if any, from contacting sensitive disc drive parts, a lubricant is coated on the stationary part (i.e., the ramp assembly).

22 Claims, 10 Drawing Sheets

LOW WEAR, LOW FRICTION RAMP METHOD AND APPARATUS FOR A DISC DRIVE SYSTEM

BRIEF SUMMARY OF THE INVENTION

The present invention relates generally to a disc drive system, and more particularly to a ramp assembly method and apparatus for loading and unloading an actuator arm in a disc drive.

BACKGROUND OF THE INVENTION

Disc drive systems read and write information stored on concentric circular tracks on memory discs. Information or data is stored on the surface of the memory discs via a read/write transducer, or head. The data is divided or grouped together in tracks. The read/write heads, located on both sides of the memory disc, read and write information on the memory discs when they are accurately positioned over one of the designated or target tracks on the surface of the memory disc. As the memory disc spins and the read/write head is accurately positioned above a target track, the read/write head can store data onto a track by writing onto the memory disc in a particular manner. Similarly, reading data on a memory disc is accomplished by positioning the read/write head above a target track and reading the stored material on the memory disc. To write on or read from different tracks, the read/write head is moved radially across the concentric tracks to the target track.

Typical disc drives have a plurality of memory discs spaced apart and rotating about a common spindle. Because of the importance of positioning the read/write head substantially parallel to the memory disc surface, a head gimbal assembly mounted on an actuator arm. The read/write head is found at the distal end of the actuator arm on the gimbal assembly. The flexure and head gimbal assembly allow the read/write head to gimbal for pitch and roll to follow fluctuations in the imperfect memory disc surface but restrict motion in the radial and circumferential directions of the memory disc. The proximal end of the actuator arm is coupled to a pivot assembly. The pivot assembly is in turn connected to a motor system. As the disc drive system sends control signals to the motor, the motor rotates, thereby displacing the actuator arm supporting the read/write head across the memory disc in a radial direction to the target track. The control signals indicate to the motor the magnitude and direction of the displacement.

In many disc drives, ramp assemblies are utilized to prevent actuator arm assembly and specifically the transducer it supports from contacting the discs when the transducer is in the park or non-operating position. In the park mode, the actuator arm assembly is moved to the perimeter of the disc where a ramp assembly is located. Preferably, the ramp is located adjacent the edge of the disc, so that no data storage space on the disc is lost. Alternatively, the ramp assembly is located at the perimeter of the disc over an unrecordable region of the disc. The head cannot read or write data when the actuator arm is parked, on the ramp. The ramp assembly displaces the actuator arm assembly in a vertical direction to prevent it from touching the disc even in the event of a significant shock.

In many prior art designs, the loading (moving the actuator arm into position to fly over the disc) and unloading (moving the actuator arm onto the ramp assembly) steps generate debris as a portion of the actuator arm (e.g., the flexure) slides or rubs against the ramp surface. Many ramp assemblies are made of plastic whereas the flexure is made of metal. Metal (e.g., stainless steel) flexures will scrape away at any surface that it rubs against. Metal flexures rubbing against plastic ramps generate a substantial amount of debris which are detrimental to sensitive parts of the disc drive system. These metal-on-plastic assemblies generate high friction and thus, are not an optimum low-friction combination for minimizing actuator torque required to load and unload the actuator arm. Additionally, smaller disc drive systems (e.g., 1.8-inch or smaller) require very small, thin, and robust ramp parts. Plastic ramps are not structurally robust.

Other combinations of flexure and ramp assembly parts such as metal-on-metal generate excessive friction and wear. The debris resulting from such wear is undesirable for these sensitive disc drives. The predominant solution in the industry has been to avoid using ramps altogether to eliminate debris. Some manufacturers utilize ramps and live with the risk of high-wear (and thus, high-debris) disc drive systems.

OBJECTS AND SUMMARY OF THE INVENTION

An object of the invention is to minimize the generation of debris due to a ramp assembly in a disc drive system.

Another object of the invention is to substantially prevent debris from contacting sensitive disc drive parts.

A further object of the invention is to minimize friction to minimize actuator torque required to load and unload the actuator arm.

The foregoing and other objects are achieved by a disc drive system utilizing a ramp and actuator arm assembly where both the ramp surface and the contacting portion of actuator arm surface are coated with a hard, low-friction polymer such as a Teflon (polytetrafluoroethylene or tetrafluoroethylene) and molybdenum-disulfide loaded polyamide. Additionally, applying a lubricant to the stationary part confines flying debris within the lubricant. Usually, the stationary part is the ramp assembly. The coating-on-coating between the two rubbing surfaces minimizes debris and friction.

BRIEF DESCRIPTION OF THE DRAWINGS

The foregoing and other objects will be more fully understood from the following detailed description read in connection with the accompanying drawings, in which.

DETAILED DESCRIPTION OF THE PREFERRED EMBODIMENT

Figure 1:
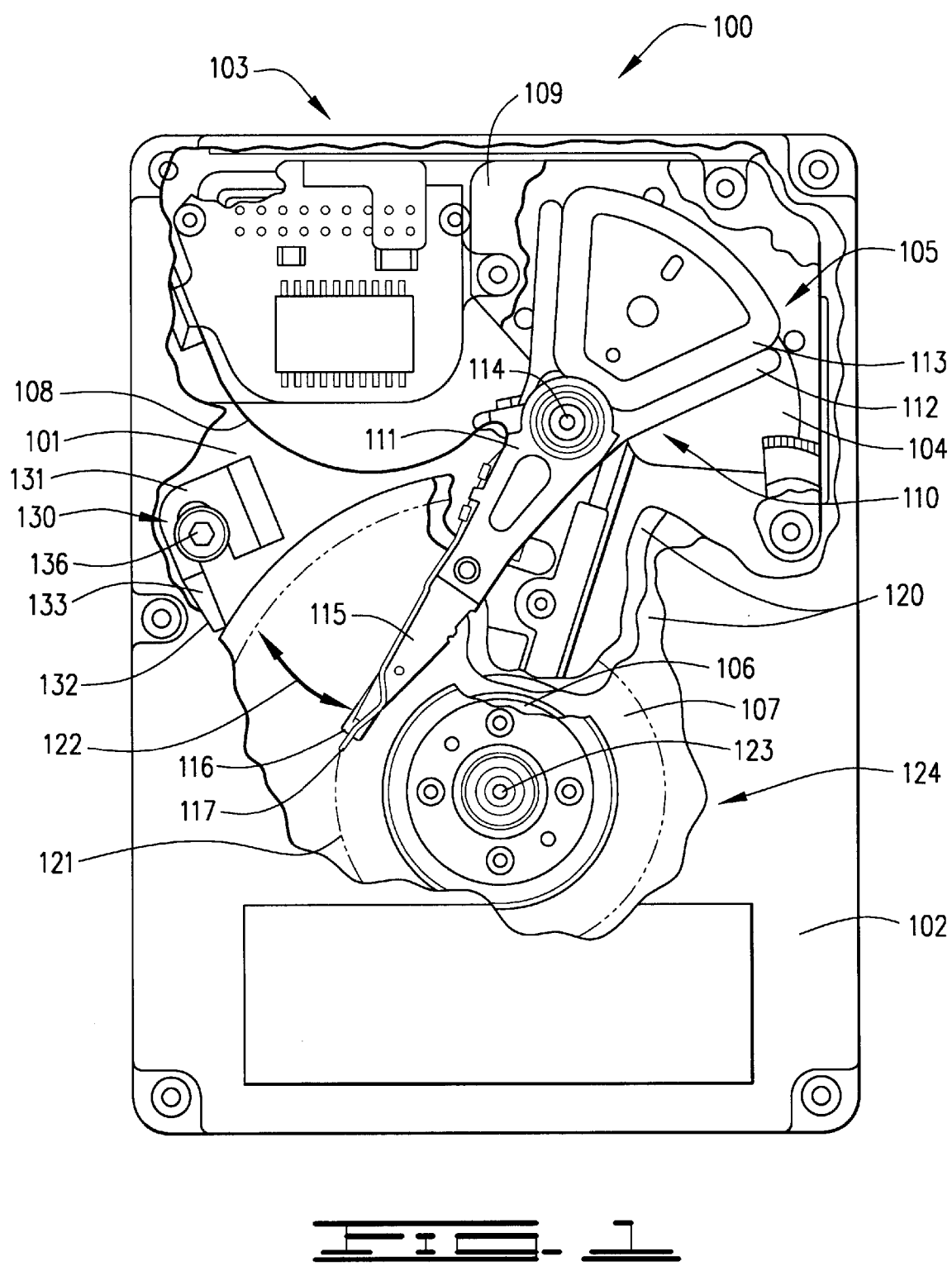
FIG. 1 is a cutaway top plan view of one embodiment of the present invention where the read/write head is near the spindle hub.

FIG. 1 shows a cutaway top plan view of a typical disc drive system. Here, disc drive system 100 comprises voice coil motor assembly 105, actuator arm assembly 110, spindle assembly 124, ramp assembly 130, and electronic circuitry 103. These major assemblies are secured to base housing 101 and sealed with top cover 102.

FIG. 1 shows a multiple stacked disc drive, although the embodiments of the present invention are also applicable to single disc drives. FIG. 1 also shows voice coil motor 105; however, embodiments of the present invention are applicable to all types of motors, such as stepper motors.

As part of voice coil motor assembly 105, permanent magnet 104 is installed under voice coil motor cover plate 109. Voice coil motor assembly 105, in response to control signals from electronic circuitry 103, drives or swings actuator arm assembly 110 radially in the direction of arc 122 before settling on target track 121. Actuator arm assembly 110 comprises mounting support 111, Y-shaped coil mounting arm 112, coil winding 113, flexure 115, and read/write head 116. Actuator arm assembly 110 rotates about pivot shaft 114. Swage hole 117 is located at the overlap of mounting support 111 and flexure 115. Electronic circuitry 103, via printed circuit cable (PCC) 108 transmits and receives control signals to and from voice coil motor assembly 105, and data signals to and from read/write head 116.

Discs 120 rotate about spindle assembly 124, comprising spindle shaft 123, spindle hub 106, and spindle motor 107. To prevent damage to discs 120 by read/write head 116 as discs 120 rotate, ramp assembly 130 parks actuator arm assembly 110 via extension 117 of flexure 115. Having been parked on ramp assembly 130, read/write head 116 is physically displaced away from disc 120. Thus, in the park mode, flexure extension 117 slides on the inclined upper ramp surface 132 and rests on upper level surface 133 as rotating discs 120 slow to a stop about spindle shaft 123. In this example, to secure the position of ramp assembly 130, ramp mounting flange 131 is bolted to base housing 101 via screw 136. Obviously, many other suitable approaches to mounting ramp 132 are available.

Figure 2:
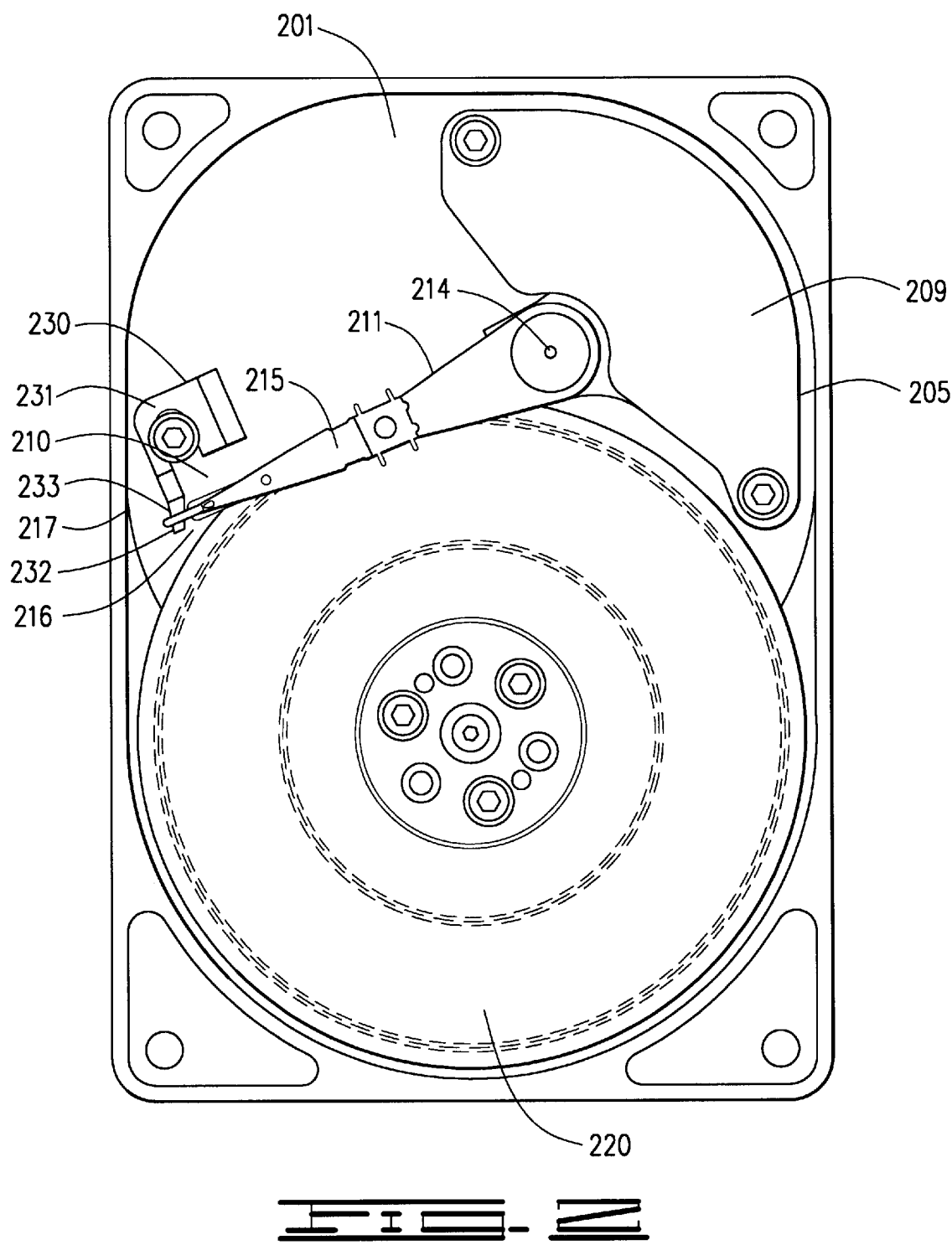
FIG. 2 is a top plan view of an embodiment of the present invention where the read/write head is on the ramp assembly.

FIG. 2 shows flexure extension 217 in the process of being parked on ramp assembly 230. As extension 217 slides up upper ramp surface 232 and rests on upper level surface 233, both friction and wear are encountered. All embodiments of the present invention minimize friction and wear of the sliding (212) and stationary (232 & 233) surfaces.

In one embodiment of the present invention, extension 217 and ramp assembly 230 are both made of stainless steel. The surfaces of extension 217 and ramp assembly 230 contacting each other are coated with a hard, low-friction fluoropolymer loaded with Teflon (polytetrafluoroethylene or tetrafluoroethylene) and/or molybdenum disulfide. Some commercial brands are Whitford Xylan 1052DF/880, Whitford Xylan 1014/524, or Whitford Xylan 1054. In tests conducted with these compounds, excellent results in the form of low friction and low wear were obtained for millions of load/unload cycles. (All names written in capital letters in this and later paragraphs are trademarks.)

The compound is sprayed on both parts with standard spray techniques and cured for 10 minutes at 232° C. In one embodiment, two coats of approximately 0.7 mils (0.0007 inch) are recommended for each part. Because some small amount of wear (debris) and external contamination are always present between two rubbing surfaces (flexure (217) and, ramp (272) and level (272) surfaces of the ramp assembly), a very light lubricant is applied to the stationary surface. Typical lubricants are Fomblin and Krytox. Usually, the stationary surface is the ramp assembly. The lubricant confines potential loose particles in the lubricant and prevents them from interfering with other sensitive drive parts. Thus, in one embodiment, the rubbing of compound-coated flexure extension 217 and polymer and lubricant-coated ramp assembly 230 minimizes friction and the amount of debris generated. Flying debris are minimized with a lubricant which confines the debris within the lubricant. In contrast to other ramp and flexure rubbings, the present invention provides for coating-on-coating rubbing. Coating-on-steel rubbings cause debris and are undesirable. To be effective, in accordance with the present invention, both the actuator arm and the ramp assembly are coated with (or formed of) the low-friction compound. With lubricants on ramp assembly 330, flying debris are confined within the lubricant to prevent them from detrimentally affecting sensitive disc drive parts.

To confirm the novel results of the present invention, computer simulation and actual tests were conducted. FIGS. 3A–3D are computer simulations based on the following parameters, illustrated in FIG. 3F: the gap, or the gap in the transducer head where it reads or writes data, is initially set at 0.800 inch from the center of the disc; the ramp surface 332 is at an incline of 10 degrees; ramp surface 332 begins at 1.125 inch from the center of the disc; the ramp surface ends at 1.240 inch from the center of the disc, thus, the height of the ramp is 20 milliinch; and, level surface 333 ends at the crash stop, 1.324 inch from the center of the disc. Because the transducer gap follows an arcuate path across the disc to the ramp, all distances are measured in radial distances. The ratio of gap velocity to swage hole velocity is 2:1.

The effectiveness of the present invention can be determined by analyzing the changes in the coefficient of friction $\mu$ along the ramp surface. Force (or mass times acceleration) on an object is proportional to the coefficient of sliding friction times the normal force on the object. Thus, by plotting velocity vs. time along the ramp surface for different load/unload cycles, changes in the coefficient of friction can be determined. Greater wear and tear (and thus debris) of the rubbing surfaces result in greater changes in the coefficient of friction. Logically, less wear and tear of the rubbing surfaces imply less changes, if any, in the coefficient of friction.

Figure 3A:
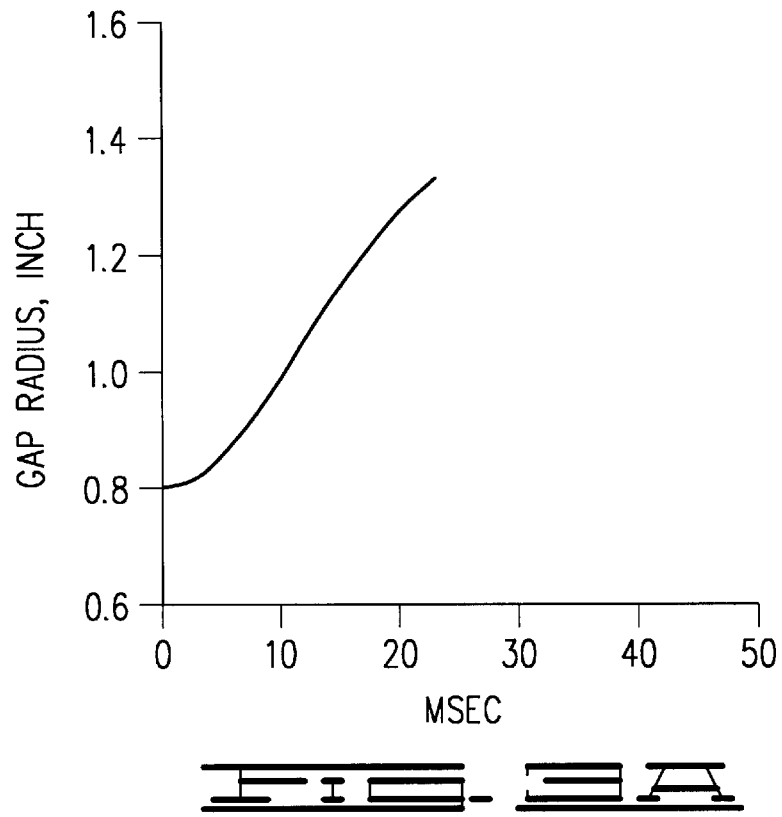
FIGS. 3A–3D are computer simulations showing the dynamic characteristics of one embodiment of the present invention.
Figure 3B:
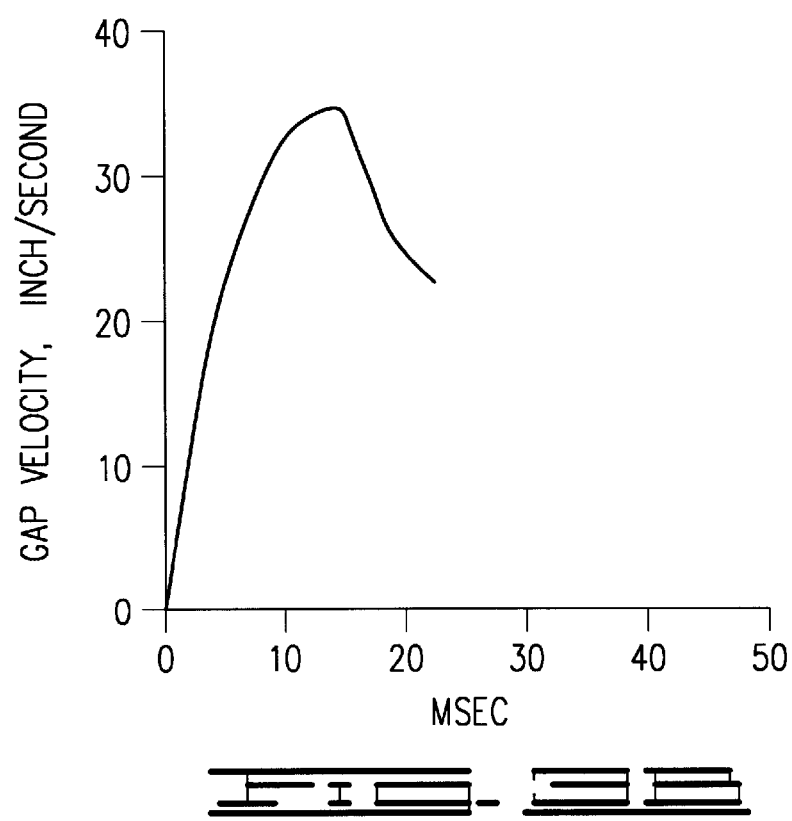
Figure 3C:
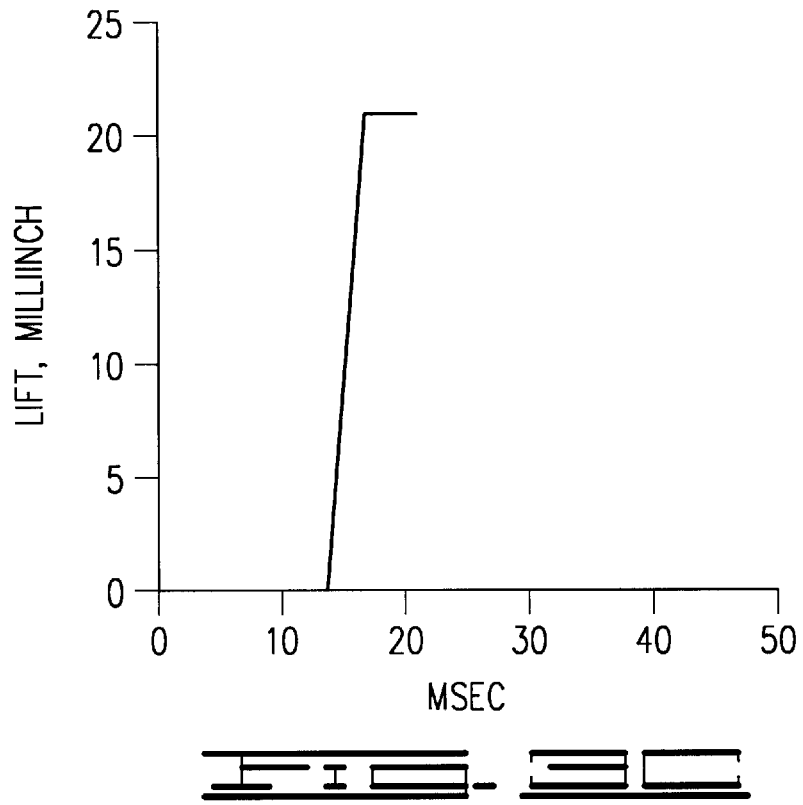
Figure 3D:
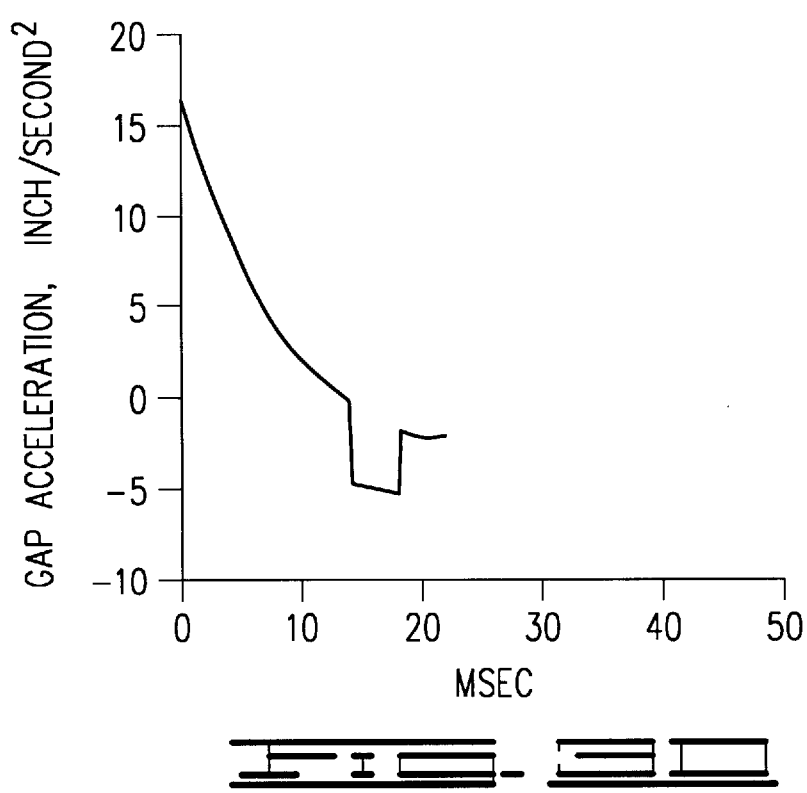

FIG. 3A shows the radial distance travelled by the transducer gap with respect to time. The transducer gap starts at 0.800 inch and stops at 1.325 inch, as specified above. FIG. 3B shows gap velocity in inch/sec with respect to time. The gap steadily increases in velocity as it travels toward the ramp. When it reaches the ramp at approximately 14 msec, the frictional resistance and the incline cause the velocity of the transducer gap to decline (from 14–20 msec) until it reaches the level surface where the velocity does not decrease as steeply. FIG. 3C shows the lift in milliinch due to the ramp. As expected, the effectiveness of the ramp begins at approximately 14 msec and lasts until 20 msec where the full height of the ramp is reached, at 20 millinch. FIG. 3D is a plot of gap acceleration v. time. The plot shows the steep decrease in acceleration at the beginning of the ramp and a sharp increase at the beginning of the level surface. Otherwise, the acceleration decreases only slightly throughout the ramp and the level surface. Sudden changes in acceleration can cause the lifted slider to gyrate and bounce unnecessarily. By shaping the ramp properly and rounding smooth corners, acceleration changes (and slider bounding) can be minimized.

Figure 3E:
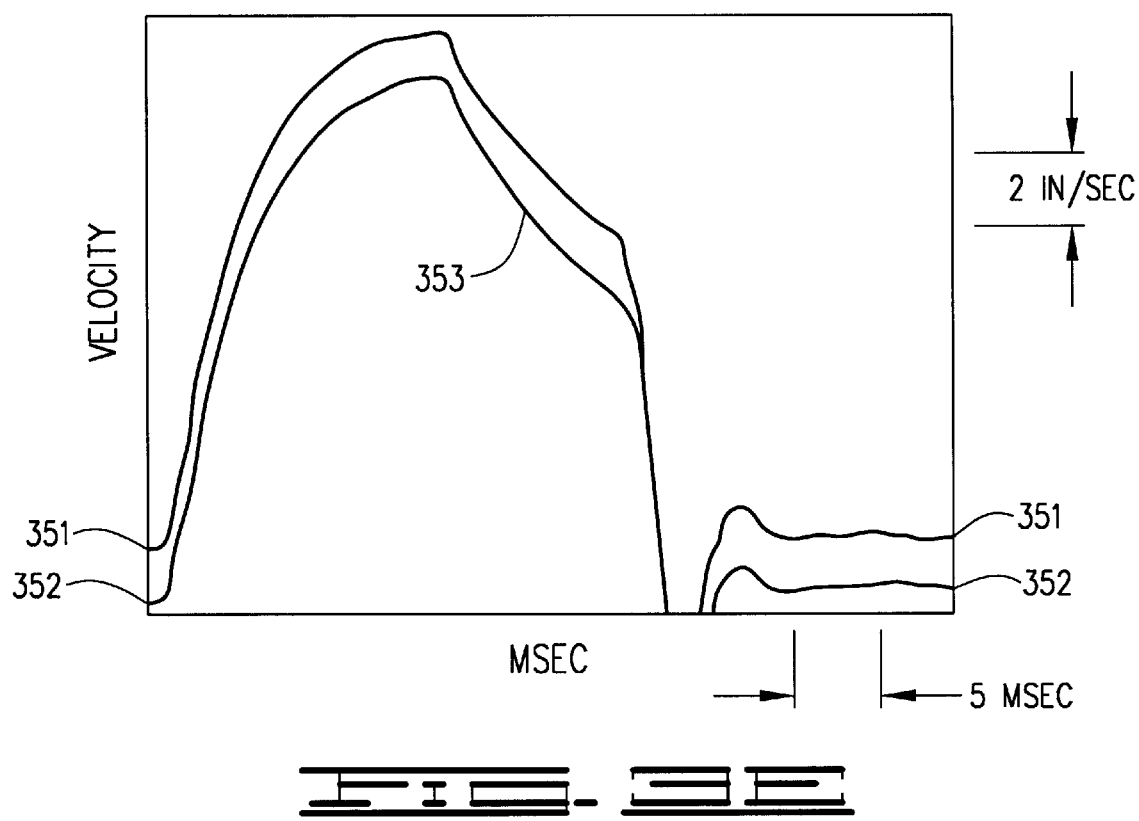
FIG. 3E shows an actual velocity v. time play of the first run and after 252,000 runs.
Figure 3F:
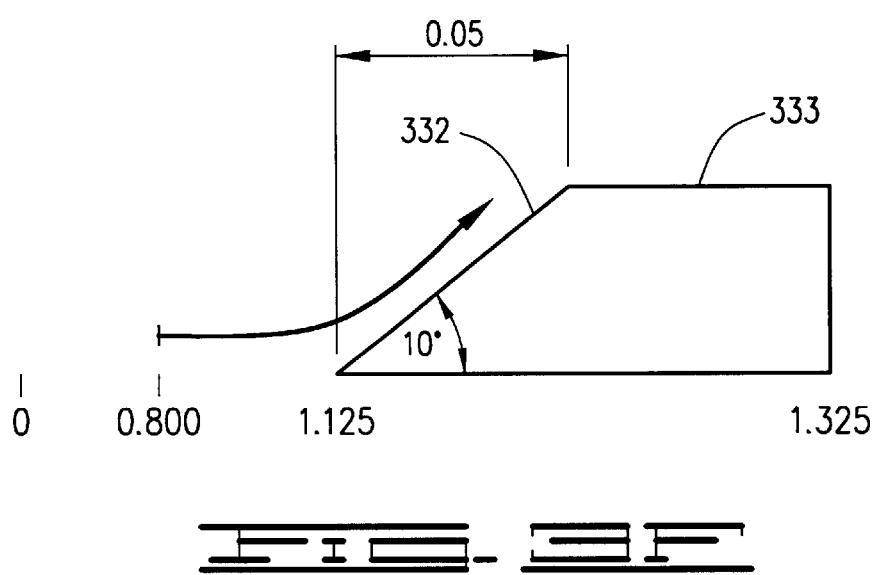
FIG. 3F shows the physical parameters of the ramp used to run the tests of FIGS. 3A–3E.

FIG. 3E shows an actual velocity v. time plot. Velocity was measured with a laser doppler vibrometer (LDV) focused near the swage hole. Here, an embodiment of the present invention is tested for multiple load and unload cycles to determine whether changes in the coefficient of friction indicate that some wear occurred. After coating the flexure and ramp surface with the low friction hard compound, a velocity curve is generated. Curve 351 represents the first run. The device behaves as predicted in the computer simulation. Velocity rises with time until the gap reaches the ramp surface. Sliding along the inclined ramp surface, velocity decreases due to friction and the inclination of the ramp. At the level surface, acceleration increases slightly as velocity levels off. The gap stops abruptly at the crash stop, at 1.325 inch from the center of the disc. The remaining oscillation at the end represents the actuator arm assembly bouncing back and forth until it stops at the end of the level surface in park mode.

Curve 352 represents the velocity v. time curve after 252,000 iterations, or load/unload cycles. Curves have been slightly displaced vertically relative to each other to facilitate comparison. The effectiveness of the coating-on-coating embodiment of the present invention is clearly evident. Instead of a dramatic decrease in the velocity due to changes in the coefficient of friction along the ramp surface, curve 352 shows that the coatings were effective in minimizing wear (and thus limiting change in the coefficient of friction) and friction. Region 353 of the curve represents the velocity along the ramp surface. After 252,000 repetitions, the coefficient of friction did not change dramatically. In fact, the measured coefficient of friction of ~0.18 did not change. With friction minimized, the actuator torque required to load and unload the actuator arm is lowered. The voice coil motor thus requires less power to drive the actuator arm to and from the ramp. This is a key requirement when drive power is turned off because the only available energy to unload the leads in the small amount stored in the spinning spindle motor.

Figure 4A:
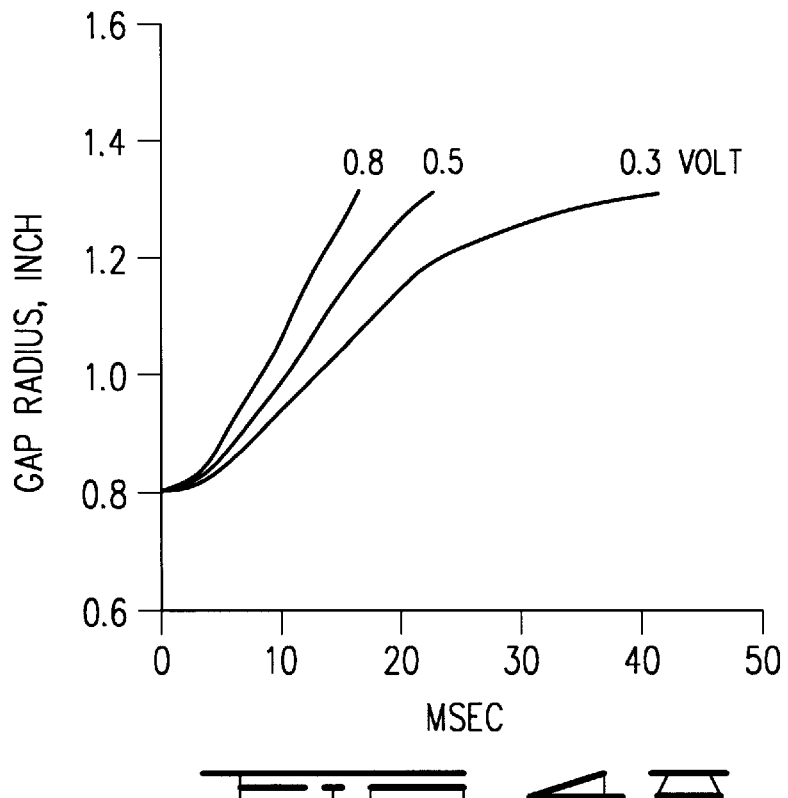
FIGS. 4A–4D are computer simulations showing the dynamic characteristics of an embodiment of the present invention where the flexure travels at three different velocities (in the form of voice coil motor voltages).
Figure 4B:
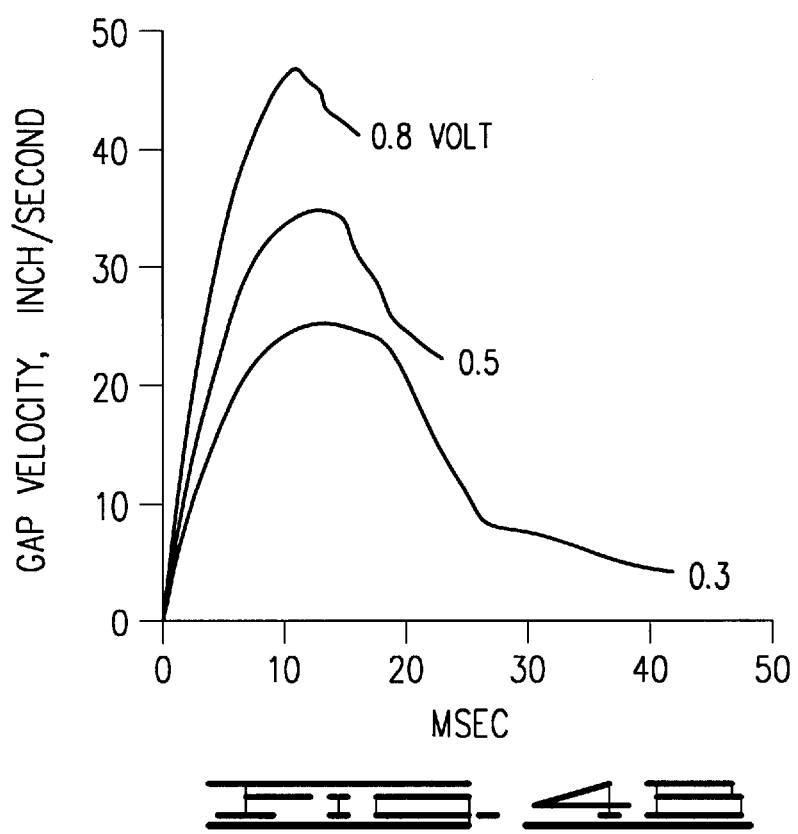
Figure 4C:
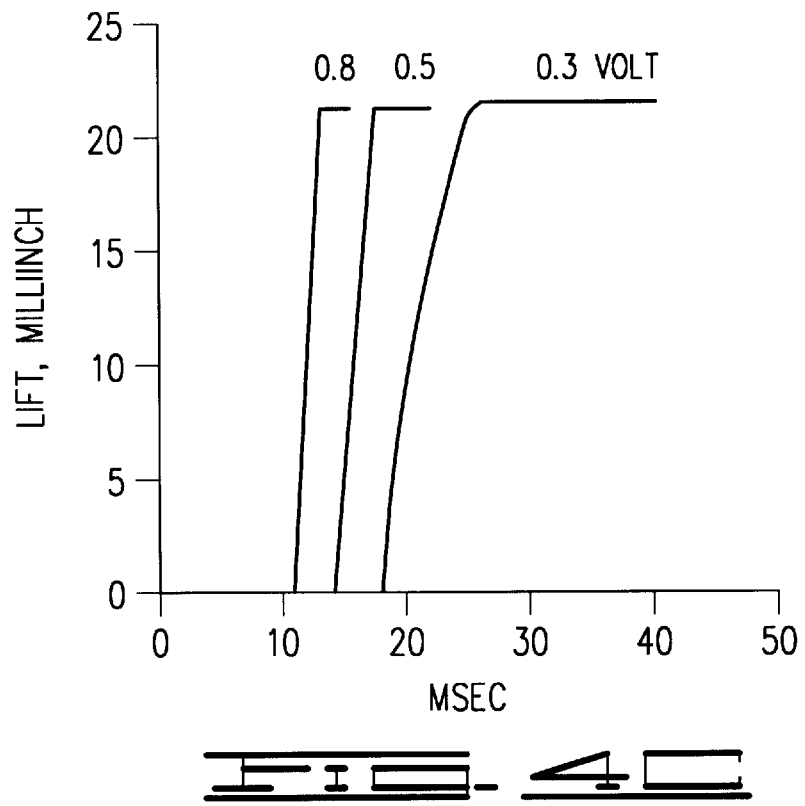
Figure 4D:
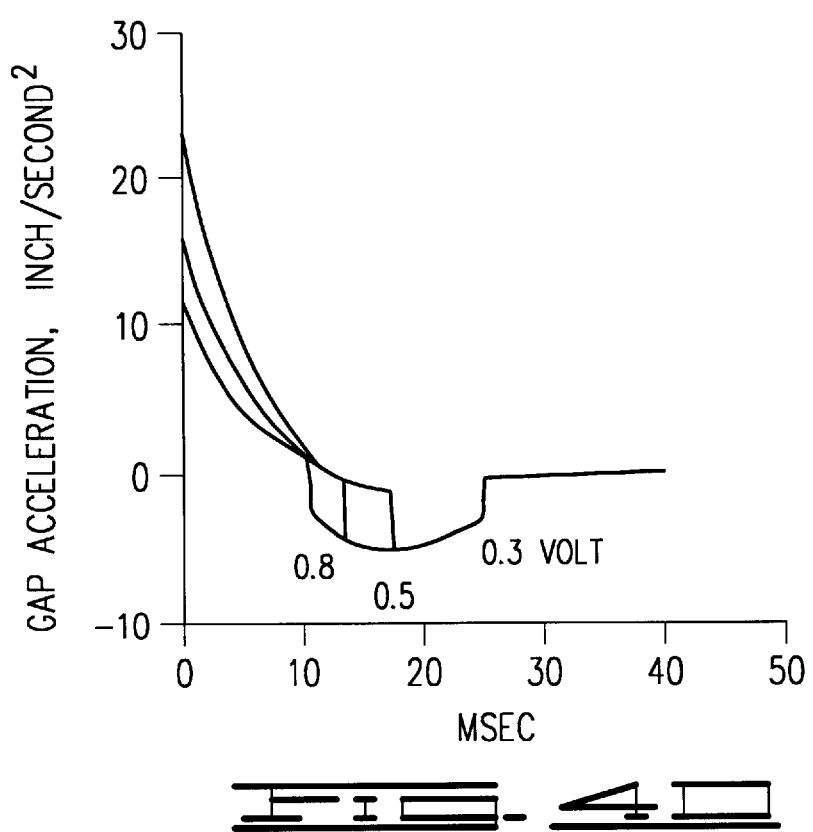
Figure 4E:
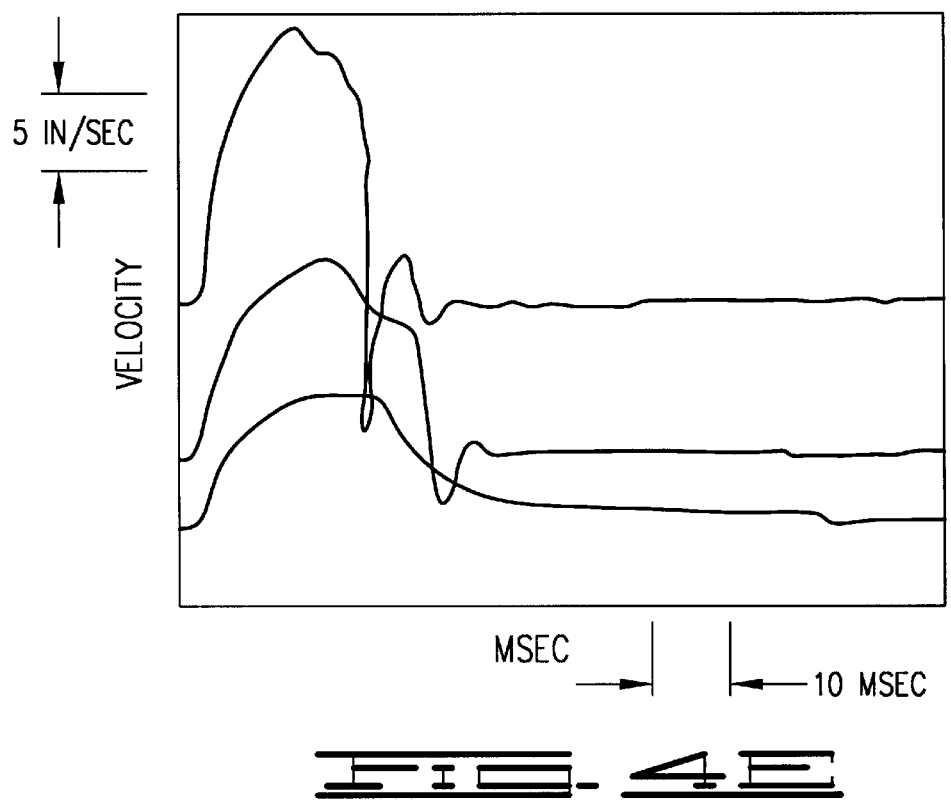
FIG. 4E shows an actual velocity v. time plot of the three velocities of FIGS. 4A–4D.

Measurements from computer simulation and actual runs were made to determine whether the results would be different with different velocities of the gap (i.e., different voice coil motor voltages). The same physical ramp parameters were used. FIG. 4A shows gap radius with elapsed time that is consistent with that of FIG. 3A, FIG. 4B shows gap velocities with respect to time. Again, the results were consistent with FIG. 3B. FIGS. 4C and 4D show lift and gap acceleration with respect to time, with results that were consistent with that of FIGS. 3C and 3D. Actual plots of gap velocity v. time, as shown in FIG. 4E, are consistent with the results obtained for FIG. 3E, for single and multiple cycles.

FIGS. 5A–5D show computer simulation results when the initial radial position of the gap is at 1.000 inch and 1.125 inch from the center of the disc. Typically, appropriate PCC bias controls the equilibrium position of the actuator arm assembly (and gap position) when the voice coil motor is not driving the arm across the disc. Computer simulation results show that when the gap is at a radial position closer to the ramp, velocity is higher, the gap will reach the ramp faster, the gap will slide up the ram faster, and thus, the gap will spend less time on the ramp surface.

Figure 5A:
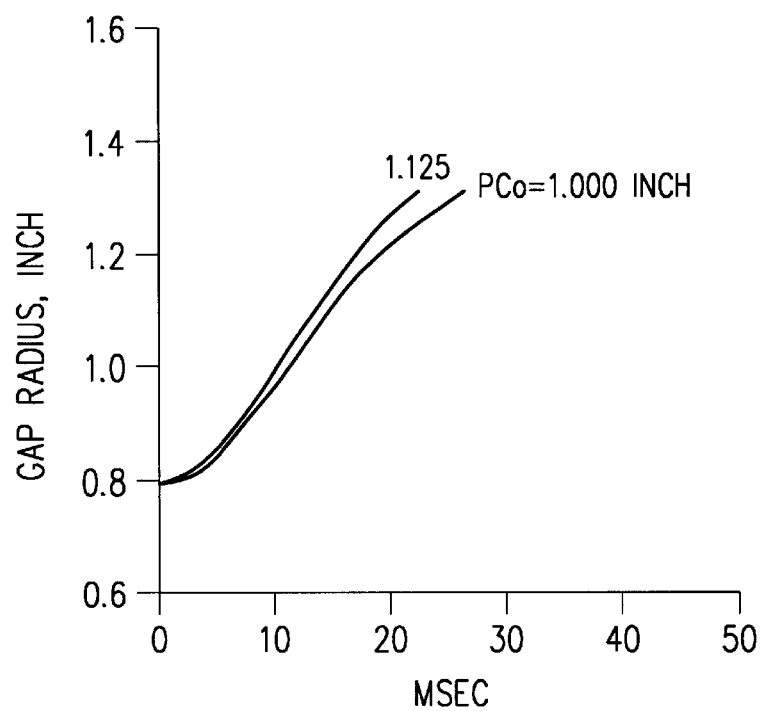
FIGS. 5A–5D are computer simulations showing the dynamic characteristics of one embodiment of the present invention for two different initial radial positions.
Figure 5B:
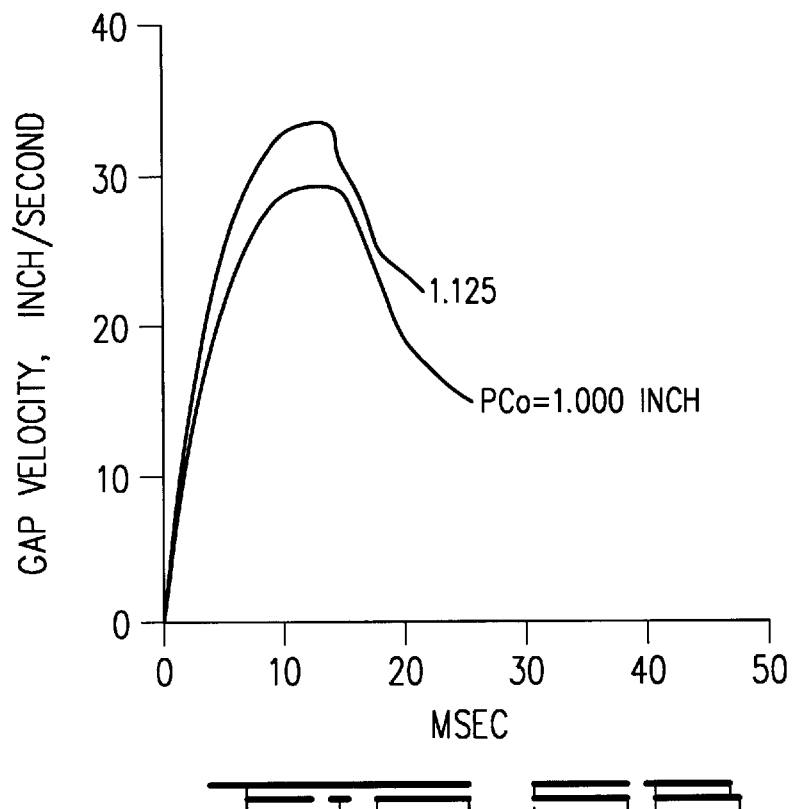
Figure 5C:
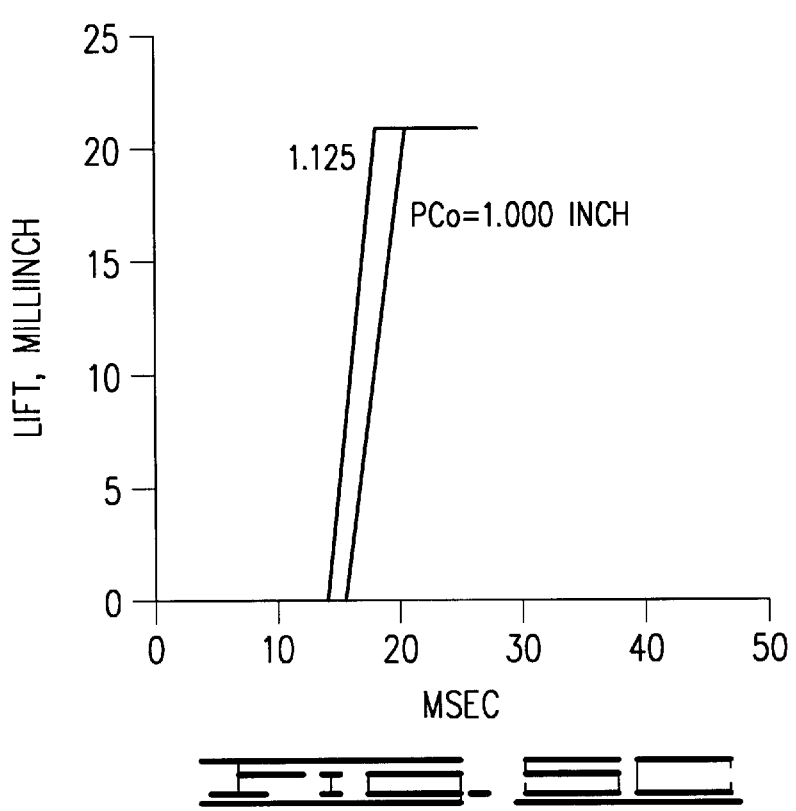
Figure 5D:
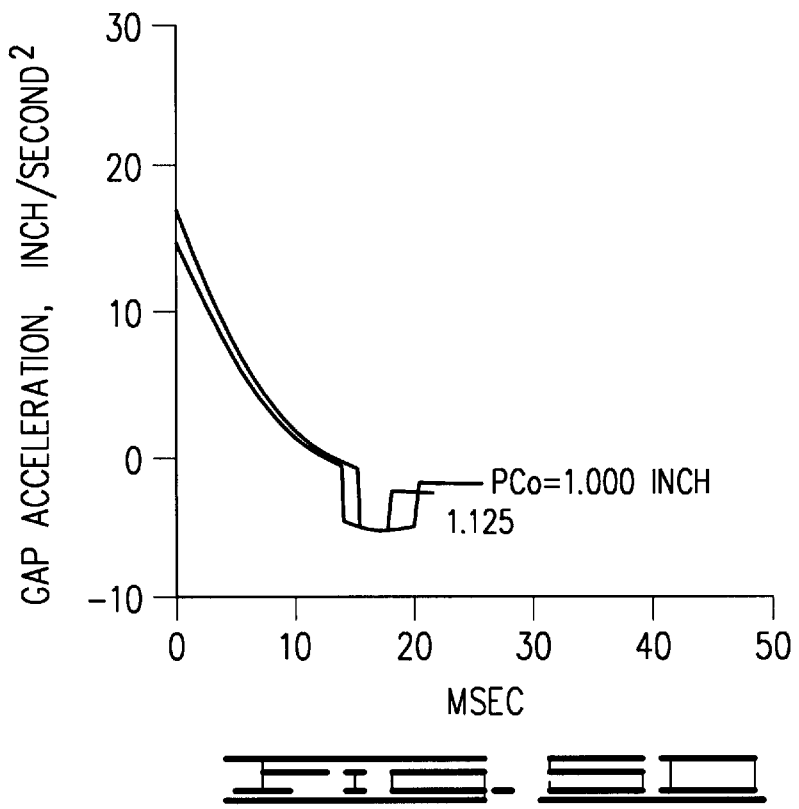
Figure 5E:
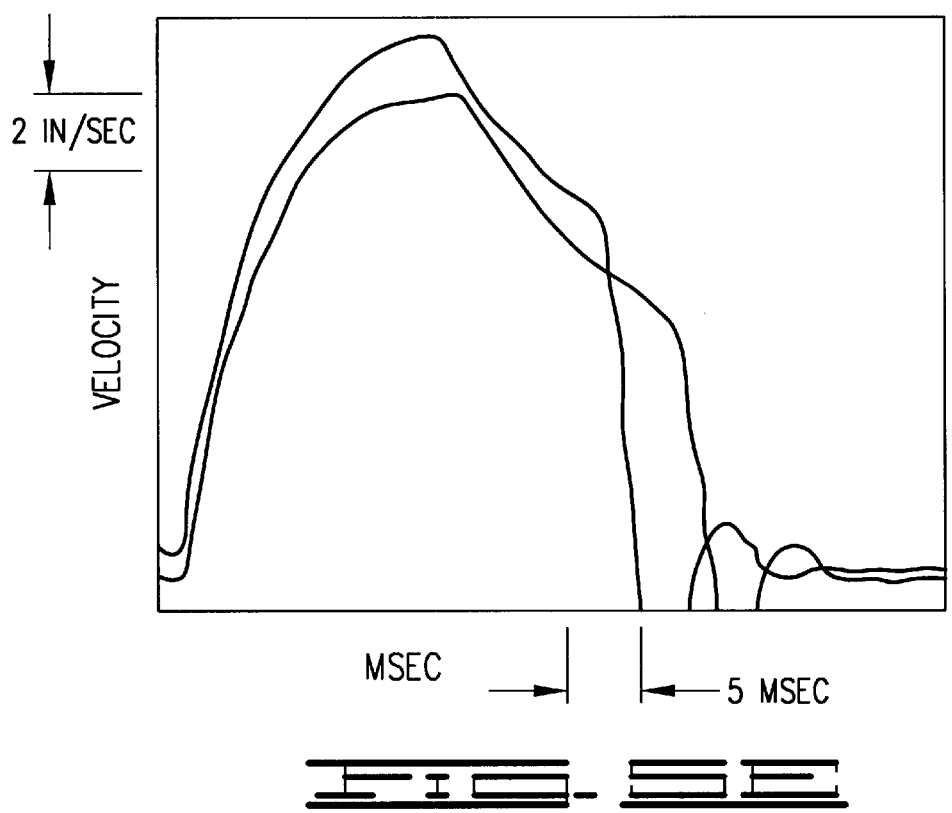
FIG. 5E shows an actual velocity v. time plot for the two different initial radial positions.

One with ordinary skill in the art can appreciate the desirability of designing disc drive systems where the equilibrium position of the actuator arm (i.e., no power to the voice col motor) is near the ramp. Thus, designing an appropriate bias on the PCC is one means of accomplishing this objective. The natural spring characteristic of the PCC can facilitate the movement of the actuator arm across the ramp, thus requiring less power from the voice coil motor. With proper PCC bias, the actuator arm self parks at power shut-down. Actual measurement of velocity v. time, as shown in FIG. 5E, confirm the computer simulations.

Tests were conducted for various combinations of other materials. Total load/unload cycles exceed 5,000,000. A button attached to the flexure can be utilized. The button is either coated with the material where appropriate (e.g., Xylan) or is formed of the material where the material is a solid. Good results (little or no debris from wear and friction) were obtained with a button of Nylon 6/6 (+2% silicone) and a ramp of acetal (Delrin) and a thin layer of Fomblin. Other good results (for thousands of load/unload cycles), and hence within the scope of this invention, are as follows:

TABLE 1

Listed in decreasing order of "goodness"

| Flexure | Ramp |
| --- | --- |
| Xylan | Xylan & Fomblin |
| RL4410 | A/A, Xylan, & Fomblin |
| Delrin | Al & Xylan |
| Nylon | Delrin & Fomblin |
| Nylon & $MoS_2$ | Delrin |
| Delrin | Nylon & $MoS_2$ |
| Delrin | Nylon |
| Delrin | Fomblin |

Delrin is an acetal resin.

Some combinations of coatings or materials yielded undesirable results, and hence not within the scope of this invention. The following Table 2 lists some combinations that generated considerable amounts of debris from the wear and friction of ramp/flexure rubbings:

TABLE 2

Coatings yielding undesirabie results

| Coating on Flexure | Coating on Ramp |
| --- | --- |
| none | none |
| Nylon & $MoS_2$ | none (polished stainless steel) |
| Delrin AF | none (stainless steel |
| RL4410 | none (polished stainless steel) |
| none | Delrin |
| none | Nylon |
| none | RL440 |

Delrin is a trademark of DuPont; RL4400 a product of LVP Engineering Plastics.

Although the present invention has been described with reference to a particular embodiment, additional embodiments, applications, and modifications that are obvious to those skilled in the art or are equivalent to the disclosure are included within the spirit and scope of the invention. Therefore, this invention should not be limited to the specific embodiment discussed and illustrated herein, but rather by the following claims and equivalents thereof.

I claim:

1. A disc drive system comprising:
   transducer means for reading and writing data on a disc;
   disc rotation means for the placement and rotation of a disc;
   motor means for moving an actuator arm assembly;
   an actuator arm assembly for mounting and controllably positioning the read/write head on a desired track of the disc, wherein the actuator arm assembly is coated with a first low-friction material; and
   a ramp located closely adjacent the outer perimeter of the disc for mounting the actuator arm assembly during rotation of the disc, wherein the ramp assembly is coated with a second low-friction material.

2. A disc drive system as in claim 1 wherein the ramp is further coated with a lubricant over the low-friction material.

3. A disc drive system as in claim 1 wherein the first and second low-friction material comprises a fluoropolymer loaded with tetrafluoroethylene and/or molybdenum-disulfide loaded fluoropolymer.

4. A disc drive system as in claim 3 wherein the ramp is further coated with a lubricant over the low-friction material.

5. A disc drive system as in claim 1 wherein the ramp is constructed of stainless steel.

6. A disc drive system as in claim 5 wherein the first and second low-friction material comprises a fluoropolymer loaded with tetrafluoroethylene and/or molybdenum-disulfide loaded fluoropolymer.

7. A disc drive system as in claim 6 wherein the ramp is further coated with a lubricant over the low-friction material.

8. A disc drive system as in claim 5 wherein the ramp is further coated with a lubricant over the low-friction material.

9. A disc drive system as in claim 1 wherein two coats of at least 0.7 milliinch of each said low-friction material are applied to the ramp means and the actuator arm assembly.

10. A disc drive as claimed in claim 1 wherein the first and second low friction material comprises a hard, low-friction fluoropolymer.

11. A disc drive system as in claim 1 wherein the actuator arm assembly is constructed of stainless steel.

12. A disc drive system as in claim 1 wherein the first and second low-friction material comprises tetrafluoroethylene and/or molybdenum-disulfide loaded fluoropolymer.

13. A disc drive system as in claim 1 wherein the ramp comprises stainless steel and the actuator arm assembly comprises stainless steel.

14. A disc drive as in claim 1 wherein the first low friction material is RL4410 and the second low friction material is A/A, Xylan, and Fomblin.

15. A disc drive as in claim 1 wherein the first low friction material is Delrin and the second low friction material is Al and Xylan.

16. A disc drive as in claim 1 wherein the first low friction material is Nylon and the second low friction material is Delrin and Fomblin.

17. A disc drive as in claim 1 wherein the first low friction material is Nylon and $MoS_2$ and the second low friction material is Delrin.

18. A disc drive as in claim 1 wherein the first low friction material is Delrin and the second low friction material is Nylon and $MoS_2$.

19. A disc drive as in claim 1 wherein the first low friction material is Delrin and the second low friction material is Nylon.

20. A disc drive as in claim 1 wherein the first low friction material is Delrin and the second low friction material is Fomblin.

21. A disc drive system comprising:
    transducer means for reading and writing data on a disc;
    disc rotation means for the placement and rotation of a disc;
    motor means for moving an actuator arm assembly;
    an actuator arm assembly for mounting and controllably positioning the read/write head on a desired track of the disc, wherein the actuator arm assembly is coated with or formed of a first low-friction material; and
    a ramp located closely adjacent the outer perimeter of the disc for mounting the actuator arm assembly during rotation of the disc, wherein the ramp assembly is coated with or formed of a second low-friction material, and is further coated with a lubricant over the low-friction material.

22. A disc drive as claimed in claim 21 wherein the first and second low friction material is a hard, low-friction fluoropolymer.

* * * * *